Aug. 5, 1969  A. E. JORDAN ET AL  3,459,249
STIFF NUTS
Filed Jan. 10, 1968  5 Sheets-Sheet 1
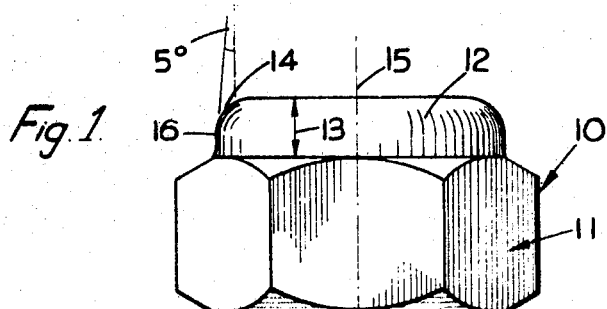
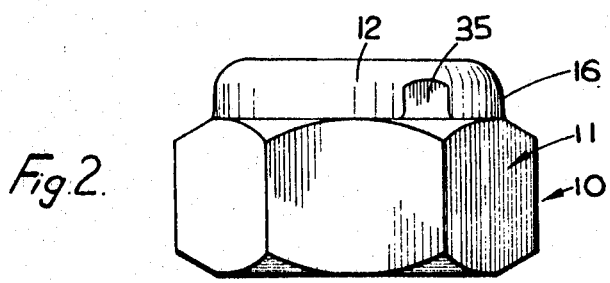
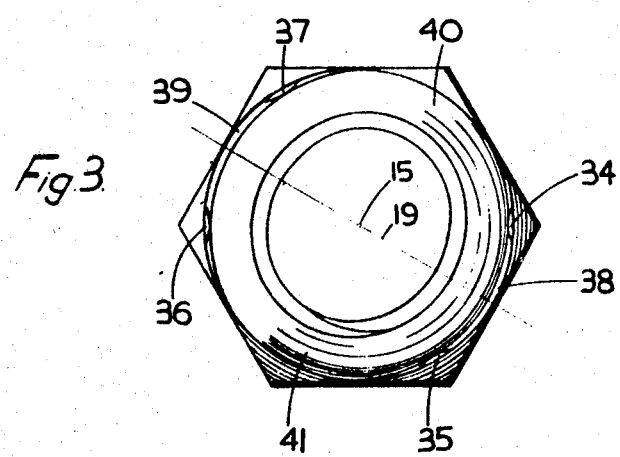
INVENTORS:
Arthur Edmund Jordan
Reginald Hugh Williams
BY Spencer & Kaye
Attorneys Aug. 5, 1969  A. E. JORDAN ET AL  3,459,249
STIFF NUTS Filed Jan. 10, 1968  5 Sheets-Sheet 3

INVENTORS:
Arthur Edmund Jordan
Reginald Hugh Williams

BY Spencer & Kaye
Attorneys

Aug. 5, 1969   A. E. JORDAN ET AL   3,459,249
STIFF NUTS
Filed Jan. 10, 1968   5 Sheets-Sheet 4

INVENTORS:
Arthur Edmund Jordan
Reginald Hugh Williams
BY Spencer & Kaye
Attorneys

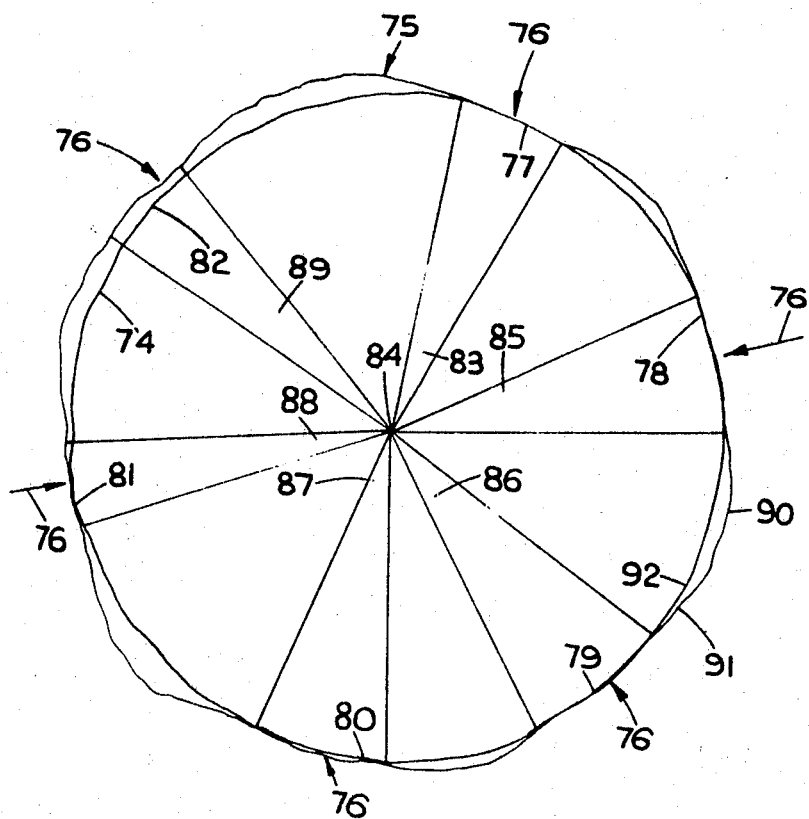

United States Patent Office 3,459,249
Patented Aug. 5, 1969

3,459,249
STIFF NUTS
Arthur Edmund Jordan and Reginald Hugh Williams, Birmingham, England, assignors to G.K.N. Screws & Fasteners Limited, Smethwick, Warley, Worcestershire, England, a British company
Filed Jan. 10, 1968, Ser. No. 696,827
Claims priority, application Great Britain, Jan. 10, 1967, 1,230/67
Int. Cl. F16b *39/02, 39/28*
U.S. Cl. 151—21      3 Claims

ABSTRACT OF THE DISCLOSURE

A stiff nut which has the required prevailing torque characteristics but which will avoid damage to a bolt. The stiff nut has a collar which is closed to elliptical shape by pressure applied at four points arranged symmetrically with respect to a diameter of the nut such that the angle between two adjacent points on opposite sides of the diameter is between 110 and 130°.

Background of the invention

*Field of the invention.*—This invention relates to stiff nuts. The stiff nuts with which the invention is concerned are of the type in which the bore of the nut is deformed to increase the frictional forces which are generated between the mating threads of the nut and of an appropriate male threaded member or bolt on which the nut is engaged.

In a threaded assembly comprising a male threaded member and a plain nut, the latter can only maintain a given position on the male member by being tightened down against a bearing surface so that the male member is tensioned and an end face of the nut forced against the bearing surface. Frictional forces are also present between the mating threads of the nut and the male member but should the frictional forces between the bearing surface and the end face of the nut diminish due to conditions of service (e.g. vibration) the frictional forces between the mating threads will also diminish and will be insufficient to prevent the nut from rotating on its male member and thus from coming loose. A stiff nut of the above type in similar conditions will resist loosening under vibration by virtue of the increased frictional forces between the mating threads due to the deformation of the bore of the nut and will thus maintain its position.

There are some generally accepted criteria for stiff nuts although these criteria have not yet been embodied in a universally acceptable standard. There are three criteria. Firstly, on first application of the nut to the male member, the nut must be capable of being turned on the free threads of the male member by the application of a torque which does not exceed a specified maximum value. Secondly, the torque required to remove the nut from the member after a repeated number of successive applications in which a proportion of the proof load of the bolt, normally 75%, is induced, must be above a specified minimum value after the dissipation of the induced tensile load in the bolt. The maximum and minimum torques vary for different sizes of nuts but there are figures which are generally accepted.

The third criterion is that after the male member has been subjected to the specified number of such applications of the nut, normally five, the male member must pass a standard gauge and must not have been damaged so severely by the application of the nut that it will no longer pass this gauge.

*Description of the prior art.*—A considerable number of proposals have been made for stiff nuts and those which are currently in use, while meeting the maximum and minimum torque criteria set forth above, have difficulty in meeting the third criterion, that they shall not unduly damage the male member or bolt.

There are many types of stiff nuts, but stiff nuts of the above type are normally plated and then coated with lubricant which is often wax-based. The most severe conditions for meeting the third criterion under which stiff nuts are commonly employed is where both the nut and the bolt are zinc plated. The frictional forces between the mating threads in these conditions promote galling and damage the plating on either the nut or the bolt or on both the nut and the bolt. In exreme cases under these conditions, seizure can result such that further torque applied to the nut in an endeavour to move it can cause fracture of the bolt. These extreme cases can occur where the nut is applied to the bolt by a power driver which works at a high speed thus tending to generate excessive heat between the threads of the nut and the bolt.

There are two features of the majority of stiff nuts currently commercially available which militate against the satisfaction of the third criterion mentioned above. Firstly, the deformation of the thread is such that the arc of embrace of the nut on the bolt is small which means that the second criterion with respect to the prevailing torque to remove the nut to be satisfied, there must be high local pressures beween the mating surfaces of the threads on the nut and the bolt. By "prevailing torque" we mean the torque required to turn the nut on the free threads of the bolt, as distinct from the torque required to turn the nut when it is engaging an abutment. We are concerned with stiff nuts in which the deformation of the thread is mainly inwardly of the bore of the nut so as to distort the bore from a circular shape, although in some cases there may be some axial deformation of the thread which assists in providing the stiff characteristic of the nut. The arc of embrace of a stiff nut, therefore, is the sum of the individual arcs of the threads which engage when a bolt of the appropriate size is inserted into the nut. It is apparent that the greater the extent of this arc of embrace, the lower need the pressure between the mating surfaces of the threads be along said arc to provide the necesary minimum prevailing torque and the less risk will there be of galling or damaging the mating threads.

The second feature is concerned with the angles of divergence between the periphery of a bolt and the flanks of the relieved portions of the bore. Thus there will, around the bore, be a series of arcs of engagement where the mating threads engage, and between each adjacent pair of such arcs there will be a relieved portion where the threads are in reduced contact. The flanks of these relieved portions will be adjacent to the arcs of engagement and will diverge from the periphery of the bolt. The greater the angle of divergence the more likelihood is there of high local pressures occurring between the mating threads thus increasing the risk of galling and stripping of the plating. Since the method of manufacture of most male threaded parts involves flat-die, thread rolling and by its nature must induce ovality, it is essential that the angle of divergence referred to above is kept to a minimum.

It is an object of one aspect of the present invention to provide a method of manufacturing a stiff nut which is simple and which results in the production of a stiff nut which is an improvement over those at present commercially available.

Summary of the invention

According to this aspect of the invention we provide a method of manufacturing a stiff nut from a blank having a wrench-engageable body part, a tubular collar part extending from one end of the body part and of less cross-sectional area than the body part and a continuous, screw-threaded, through bore in said parts; the method comprising positioning the blank with its collar part between opposed die members, relatively moving the die members together to engage and distort the collar with flat die faces at four positions arranged two on each side of, and symmetrically with respect to, the diameter of the bore which is parallel to the direction of relative movement of the die members, the angle between the lines of intersection of a plane perpendicular to the longitudinal axis of the bore and planes containing adjacent die surfaces lying on opposite sides to the diameter being between 110 and 130°, the die members distorting the collar part so that portions thereof between each pair of said adjacent die surfaces move towards said axis of the bore so that the portion of the latter in the collar part is out of round and is of approximately elliptical shape and has no sharp discontinuities in sections containing or perpendicular to said axis.

We find that by applying force to distort the bore in the collar at four positions spaced as described above we obtain, in the collar part, a bore which is sufficiently distorted out of round to give the desired stiff characteristic but which nevertheless is so shaped as to prevent any extensive damage occurring to a bolt when the nut is used thereon. We find that between each adjacent pair of die faces on opposite sides of said diameter, a portion of the collar wall is forced inwardly and its radius of curvature is increased. These portions, when the nut is in use, engage the mating threads of the bolt or male member to provide the stiff characteristic of the nut. Since, however, the inward pressure on the collar is not directly radially inward, although of course there is an inward radial component, we have found that there is no sharp discontinuity in the bore of the collar between the portions thereof which are forced inwardly and the other or relieved portions which, as a result of the inward movement of the first mentioned parts, are moved outwardly. As a result, the angle of divergence between the bolt and the relieved portions mentioned above is comparatively small and thus high local pressures are avoided when the nut is used as the mating threads of the nut and the bolt engage primarily over the inwardly displaced portions of the collar.

We also find that by adopting the method of deformation of the collar described above, the total arc of embrace between the threads in the collar and a bolt inserted into the collar is comparatively large and may approach 180° thus allowing the inward distortion of the collar portions to be such that the pressure between mating surfaces of the threads on the nut and bolt to be low thus to avoid damaging the bolt whilst still being able to obtain the minimum prevailing torque which is required to satisfy the second criterion set forth above.

As discussed in detail below, we find that by deforming the collar of the nut at four positions spaced as above, we obtain improved results as compared with stiff nuts in which the collar has been indented at less than four positions or at more than four positions.

We have found that where the collar is indented at three positions, there is a comparatively small total arc of embrace between the indented portions of the collar and the bolt so that the pressures between the mating threads over said arc of embrace have to be high to provide the minimum prevailing torque required with the result that damage to the bolt thread ensues.

We have found that where the collar of the nut is indented at six positions, although the total arc of embrace is increased as compared with a nut in which the collar is indented in only three positions, the total arc of embrace is still less than where the nut is indented at four positions spaced as required by the present invention and, moreover, the angles of divergence between the flanks of each relieved portion and the periphery of the bolt are high resulting in high local pressures as the mating threads come into contact with the threads in the collar portion in said arcs of engagement.

It is an object of another aspect of the invention to provide a stiff nut which is an improvement over those which are commercially available.

According to this aspect of the invention we provide a stiff nut comprising a wrench-engageable body part, a tubular collar part extending from one end of the body part and of less cross-sectional area than the body part, a continuous, screw-threaded, through bore in said parts, four flats on the external surface of the collar, said flats being arranged two on each side of, and symmetrically with respect to, a diameter of the bore so that the angle between the lines of intersection of a plane perpendicular to the longitudinal axis of the bore and planes containing the surfaces of two adjacent flats on opposite sides of the diameter is between 110 and 130°, first arcuate portions of the collar part between each said two adjacent flats being displaced inwardly relative to second arcuate portions of the collar part between each two adjacent flats on the same side of the diameter with respect to said axis such that the portion of the bore in the collar part is of approximately elliptical shape and has no sharp discontinuities in sections containing or perpendicular to said axis, the locations of maximum inward displacement of the collar lying between two adjacent flats on opposite sides of a said diameter.

The stiff characteristics of the nut can be enhanced by providing a slight axial compression of the threads and thus the die faces and the resulting flats may be inclined relative to the axis of the nut. Thus each flat die face or each resulting flat may be inclined at an angle of not more than 10° to a plane parallel to the longitudinal axis of the nut and intersecting the die face or flat in a line in a plane perpendicular to said axis. The angle will preferably be 5° for larger nuts and 10° for smaller nuts.

We prefer that the angle between said lines of intersection is approximately 120°.

Brief description of the drawings

The invention will now be described in detail by way of example with reference to the accompanying drawings in which:

FIGURE 1 is an elevation of a blank from which a stiff nut embodying the invention may be made;

FIGURE 2 is a side elevation of a stiff nut embodying the invention;

FIGURE 3 is a plan view of the nut of FIGURE 2;

FIGURE 9 is a diagram similar to FIGURE 8 but in which the collar has been subjected to pressure in six spaced apart positions.

Description of the preferred embodiment

Referring first to FIGURES 1 to 7, a stiff nut embodying the invention is made from a blank indicated generally at 10 in FIGURE 1 having a wrench-engageable body part 11 which is of conventional hexagonal shape and which will conform in size to one of the various standards for nuts. Extending axially from one end of the wrench-engageable body part 11 is a collar part 12 which is of a diameter slightly less than the size of the wrench-engageable portion 11 across the flats and which has an axial length indicated by the line 13 which is approximately 2 to 2½ pitches of the nut. The collar has a rounded end indicated at 14 and its side wall is tapered relative to the axis of the blank which is indicated at 15 so that the semi-apical angle of the cone of which the side wall 16 forms part is 5°. The angle of taper will depend on the size of the nut and will preferably be 5° for larger nuts and 10° for smaller nuts.

The blank is formed into a stiff nut by being placed between two relatively movable die members which are moved together to deform the collar as will now be described.

Figure 4:
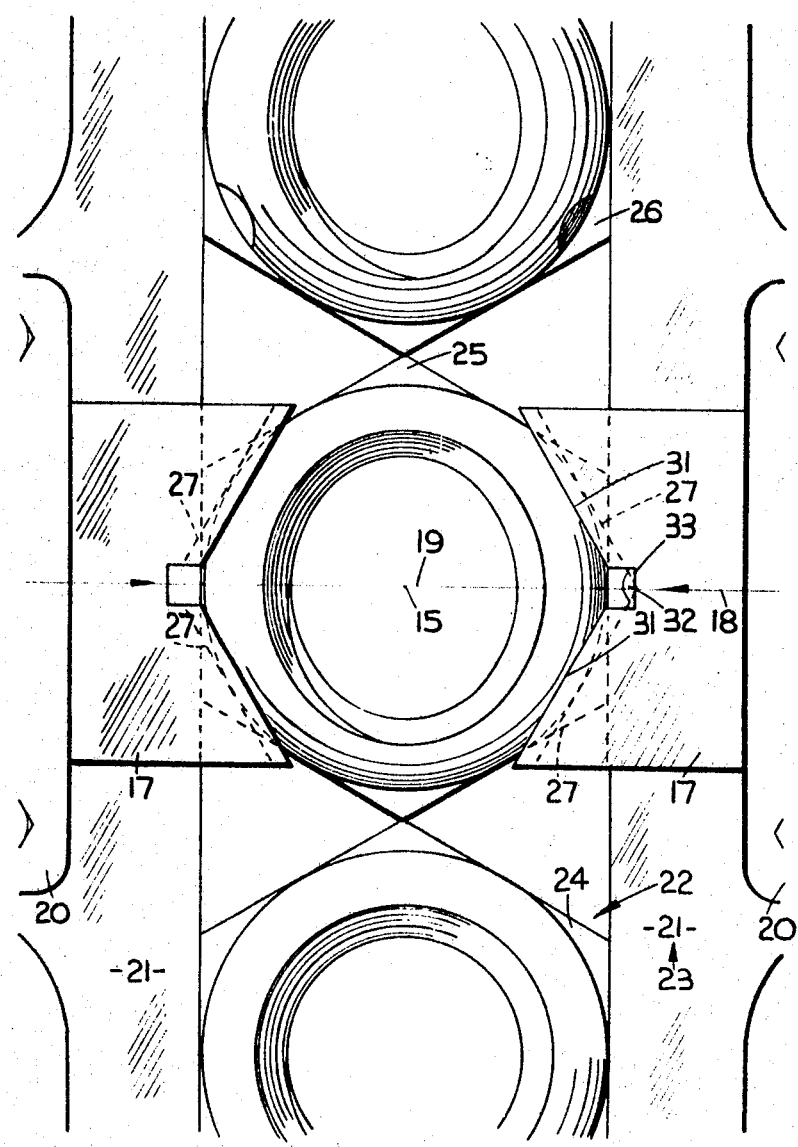
FIGURE 4 is a plan view showing the method of forming the stiff nut of FIGURES 2 and 3.

Referring to FIGURE 4, two relatively movable die members 17 are mounted for sliding movement towards and away from ane another in directions along a line 18 which is a continuation of a diameter 19 of the bore of the blank. The die members are slidably mounted in guides 20 and are moved towards and away from one another by means not shown. Mounted between two side members 21 is a conveyor indicated generally at 22, the conveyor being arranged to move nut blanks in the direction of the arrow 23 between the die members 17, the spacing between the side members 21 being such as to guide the nut blanks closely and to prevent them from turning. A nut blank 24 is shown as waiting to pass between the die members 17, a nut blank 25 is shown as being operated upon by the die members and a stiff nut is indicated at 26 which has been formed by the die members 17.

Figure 5:
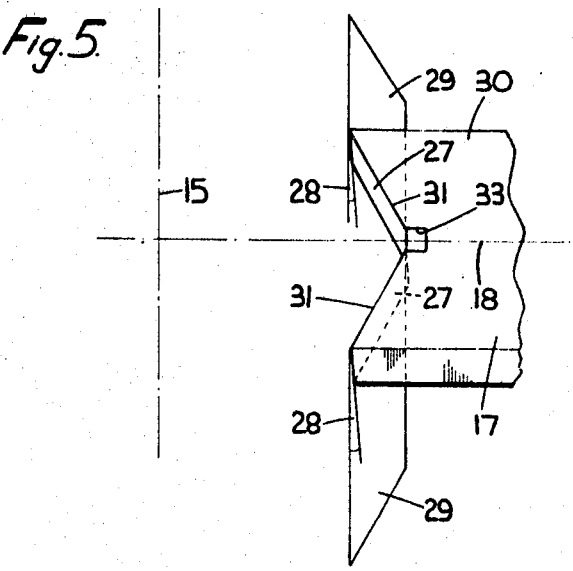
FIGURE 5 is a perspective view of one of the die slides shown in FIGURE 4 and showing the angles of the die faces.

The die members are so arranged as to engage the outer wall 16 of the collar 12 of the blank. Each die member has two flat die surfaces 27 and as indicated in FIGURE 5, these die surfaces are inclined at an angle 28 of 5° to vertical planes 29 which are parallel to the axis 15 of the nut blank and which intersect a plane perpendicular to said axis and as exemplified by the upper surfaces 30 of the die members in lines 31.

In the present instance, the axis 15 of each nut blank is arranged vertically so that the surface 30 is a horizontal plane and in fact the surfaces 27 are inclined at 5° to vertical planes containing the lines 31 but it will be appreciated that it is not necessary for the axis 15 of the nut blank to be vertical as the stiff nut is being formed. With smaller nuts the angles 28 would be 10°.

The angle 32 between the lines 31 is 120°. This is the preferred angle but the angle 32 can lie between 110 and 130°. A relief portion 33 is formed in each die member to facilitate the forming of the faces 27. It will be seen that these faces 27 are flat and thus are able to slide relative to the collar wall 16 as the die members 17 are moved together but the die faces may if desired in their upper parts be shaped to embrace the radiused end 14 of the collar although the portions of the die faces which engage the wall 16 of the collar will still be flat as described.

It will be seen that the angle between the lines 31 is in fact the angle between lines in which planes containing the flat faces 27 intersect with a plane, e.g., the upper surface 30 of the die member, which is perpendicular to the axis 15 of the blank.

The collar is deformed by moving the die members 17 together along the line 18 to provide the desired degree of deformation and the resulting shape of the bore of the collar is generally elliptical as will be described below in relation to FIGURE 7. After the collar has been deformed, the die members 17 are retracted and the conveyor 22 moves a further nut blank, i.e., the blank 24 to a position between the die members and the latter are then moved together to deform the collar of the nut blank 24.

Referring now to FIGURE 3, it will be seen that in the finished stiff nut, the wrench-engageable portion 11 of the body part is unchanged from the blank but the external surface of the collar has four flats 34, 35, 36 and 37 which are arranged symmetrically with respect to the diameter 19 of the bore of the nut. The flats 34 and 35 which are the adjacent flats on opposite sides of the diameter 19 lie in planes which, when projected on a plane perpendicular to the axis 15, result in lines in said latter plane which intersect at an angle of 120°. That is to say the flats are similar to the die surfaces 27 which form them. Similar remarks apply to the flats 36 and 37. The result of the collar closure is to move first arcuate portions 38 and 39 of the collar wall between the flats 34 and 35 and 36 and 37 respectively inwardly with respect to the axis 15 of the bore and to move second arcuate portions 40 and 41 of the collar outwardly relative to said axis.

Figure 7:
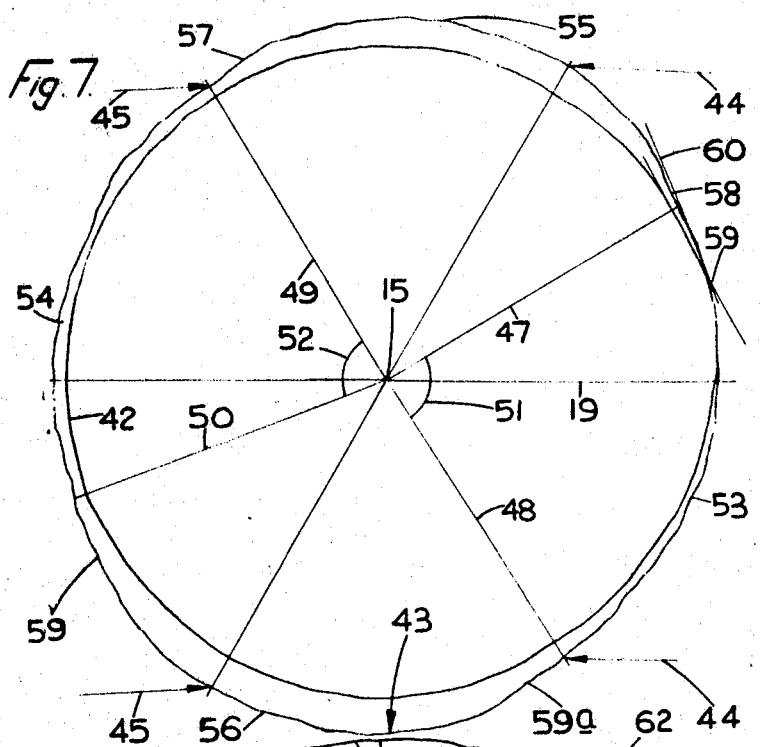
FIGURE 7 is a diagram obtained by projection techniques showing the shape of the deformed bore of the collar of a nut embodying the invention.

FIGURE 7 shows a diagram which has been obtained by a projection technique of the shape of the distorted bore of the collar after it has been deformed as described above. This diagram was obtained by inserting a brass mandrel into the deformed bore of an unthreaded nut blank and then sectioning the collar and the mandrel in a plane perpendicular to the axis of the bore, and then polishing the section and then surface illuminating the section and projecting the result on a screen from which the diagram was traced. The diagram of FIGURE 7 relates to a ⅜-inch nut blank and is fifteen times full size. The mandrel has its outer periphery indicated by the circle 42 and the shape of the bore is indicated by the line 43. The mandrel was not an exact fit in the bore but does indicate, as will be described below, the extent of the arc of embrace between the bore of the collar of a nut formed from the blank and a bolt on which it is threaded.

The arrows 44 and 45 indicate the points at which the collar wall was engaged by the die faces 27. It will be appreciated that the first contact between the outer wall 16 of the collar and each die face 27 will be a point and then as the deformation continues this point will grow into a flat as the collar is deformed.

The estimated arcs of engagement between the threads of the collar and the threads of a bolt within the collar are defined between the lines 47 and 48 and between the lines 49 and 50. The angle 51 subtended by the lines 47 and 48 at the axis 15 is approximately 90° and the angle 52 subtended between the lines 49 and 50 at the axis is approximately 80°. It will be seen, therefore, that the total extent of the arc of embrace which comprises the sum of two arcs of engagement indicated at 53 and 54 is approximately 170°. The arc 53 is that part of the line 43 between the lines 47 and 48 and the arc 54 is that part of the line 43 between the lines 49 and 50. The arcs 53 and 54 constitute first arcuate portions of the collar which are moved inwardly towards the axis 15 and there are second arcuate parts of the collar indicated at 55 and 56 which are moved outwardly and away from the axis 15 upon deformation of the collar. Each of these arcs 55 and 56 forms a relieved portion in which the threads in the bore of the collar are in reduced engagement with the threads on the bolt and each of these relieved portions has flanks where it joins the arcs of engagement 53 and 54. Thus the relieved portion 55 has flanks 57 and 58 and, in FIGURE 7, where the relieved portion 55 merges with the arc of engagement 53 there has been drawn a line 59 which is tangent to the line 42 at the end of the line 47 and a further line 60 which is tangent to the flank 58 of the relieved portion 55. It will be seen that the angle between the lines 59 and 60 is small so that there is no abrupt change in shape between the relieved portions 55 and the arc of engagement 53 which would result in a high local pressure being set up as the nut is screwed onto the bolt. Similar remarks apply to the flank 57 of the relieved portion 55 and also to the flanks 59 and 59a of a relieved portion 56.

It will be seen that the bore of the collar is thus distorted so that there is a comparatively large angle of embrace between the distorted bore of the collar and the threads of the bolt and so that the angles of divergence between the flanks of the relieved portions and the periphery of the bolt, as exemplified by the angle between the lines 59 and 60, are small thus avoiding high local pressures.

Figure 6:
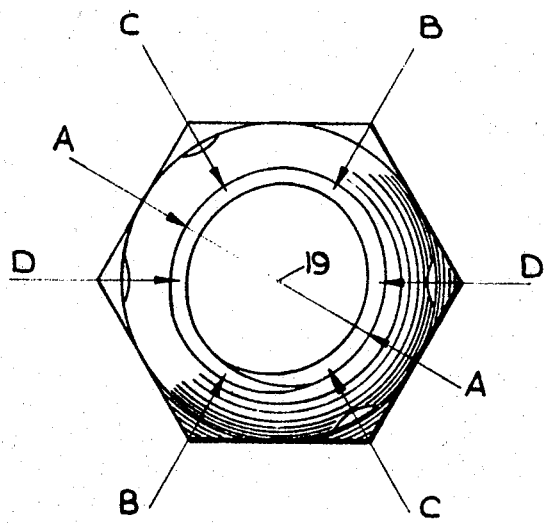
FIGURE 6 is a plan view similar to FIGURE 3 but showing the locations at which various measurements are made as referred to below.

FIGURE 6 shows the location at which measurements were made of the effective thread diameters in two samples of ⁵⁄₁₆ UNF nut made according to the invention:

| Sample | A–A ins. | B–B ins. | C–C ins. | D–D ins. |
|---|---|---|---|---|
| 1 | .28576 | .29470 | .29221 | .29368 |
| 2 | .28122 | .29752 | .29435 | .29420 |

It will be seen that the points of maximum inward displacement lie substantially on the diameter 19 of the bore i.e. the diameter along which the die members are moved towards one another. It is apparent that the points of maximum inward displacement are thus not deformed since they are spaced from the flats 34, 35, 36 and 37 so that these points of maximum inward displacement can be on smooth curves as shown in FIGURE 7 and since they are not in line with flats the danger of producing high local pressures as has been the case in some of the stiff nuts that have been previously proposed, is reduced.

As mentioned above, we have found that by flatting the collar at four positions spaced as described we obtain better results than with using a lesser or greater number of flattening positions.

Figure 8:
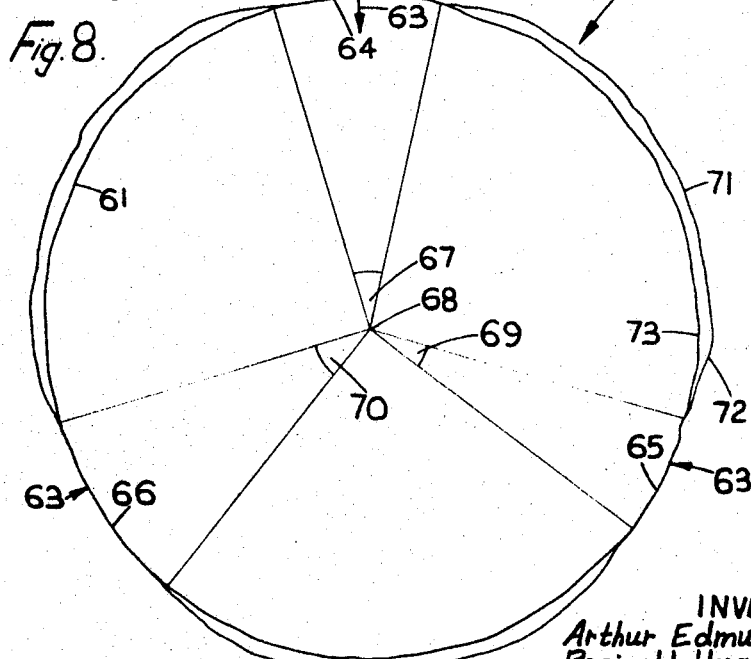
FIGURE 8 is a diagram similar to FIGURE 7 but showing the shape of a bore of the collar of a nut, the collar having been subjected to pressure in three spaced apart positions.

Referring to FIGURE 8, this shows a diagram obtained in a manner similar to FIGURE 7 but in which the collar of the blank was indented at three positions equiangularly spaced around the periphery of the collar. Referring to FIGURE 8, the outline of the mandrel is indicated at 61 and the outline of the bore of the collar at 62. The collar has been deformed at three positions as indicated by the arrows 63 which are equiangularly spaced around the axis of the bore of the collar. This results in there being three arcs of engagement, each arc of engagement being opposite to one of the arrows 63 and the arcs of engagement being indicated at 64, 65 and 66. The arc of engagement 64 subtends an angle 67 of approximately 30° at the axis 68 of the collar, the arc of engagement 65 subtends an angle 69 of approximately 20° at said axis and the arc 66 tends an angle 70 of approximately 35° at said axis. The total arc of embrace, therefore, is approximately half of the total arc of embrace of a nut made according to the invention and as described in relation to FIGURE 7.

Furthermore, the angles of divergence between the flanks of the relieved portions between the arcs 64, 65 and 66 and the periphery of the mandrel as indicated by the line 61 are greater than in FIGURE 7. Thus referring to the relieved portion 71, for example, between the arcs 64 and 65, the angle between the flank 72 of this relieved portion and the adjacent portion 73 of the periphery of the mandrel is considerably greater than the corresponding angle in FIGURE 7. As compared with a collar stiff nut having three points of indentation, therefore, the invention has advantages in that the arc of embrace is substantially doubled and in that said angles of divergence are less so as to reduce the risk of galling or stripping of the threads when the nut is used on a bolt.

Referring to FIGURE 8, this shows a diagram obsimilar to FIGURES 7 and 8 but for a nut blank which has had its collar closed by being indented at six positions spaced equiangularly around the collar. The periphery of the mandrel is indicated at 74 and the periphery of the collar at 75. The six indenting positions are indicated by the arrows 76, 77, 78, 79, 80 81 and 82. With regard to the arc of engagement 82, the mandrel was not an exact fit within the bore of the collar so that the angle subtended by this arc has been estimated.

The angle 83 subtended by the arc 77 at the axis 84 is approximately 19°, the angle 85 subtended by the arc 78 is approximately 23°. The angle 86 subtended by the arc 79 is approximately 26°, the angle 87 subtended by th arc 80 is approximately 24°, the angle 88 subtended by the arc 81 is approximately 15° and the angle 89 subtended by the arc 82 is approximately 17°. It will be seen that the total arc of embrace is thus approximately 124° which is still considerably less than the arc of embrace of a nut embodying the invention. Furthermore, the angles of divergence between the flanks of the relieved portions and the periphery of the mandrel are greater than in the case either of the three point closure in FIGURE 8 or nuts embodying the invention as in FIGURE 7. Taking for example the relieved portion 90 between the arcs 78 and 79 it will be seen that the flank 91 of such relieved portion makes an angle with the adjacent portion 92 of the periphery of the mandrel which is considerably greater than the corresponding angles in FIGURE 7 or in FIGURE 8 so that there will be the likelihood of high local pressures being set up as the nut is used.

In conclusion, therefore, it will be seen that the invention provides a stiff nut, and a method of making such a nut, in which a comparatively large angle of embrace is obtained whereby the local pressure over the arc of engagement between the mating threads can be kept low while the minimum prevailing torque is still obtained. Moreover, the angles of divergence referred to above are kept small and this also reduces the tendency to local spots of high pressure. The invention has advantages over collar stiff nuts made by indenting the collar at three points or indenting the collar at six points as has been described above and it is believed that by flatting the collar at four points spaced as described and as claimed a stiff nut of particularly advantageous construction is obtained.

Various modifications may be made without departing from the scope of the invention. As described, the die members 17 reciprocate horizontally i.e. in a plane perpendicular to the axis of the nut blank and the die faces 27 are inclined at an angle of 5° to a vertical plane intersecting the die faces in a line. It will be apparent, therefore, to those skilled in the art that there will be some slight axial compression of the threads in the collar part providing the stiff characteristic for the nut but the main stiff characteristic will be obtained by the inward deformation of the collar as described above. This angle may be increased to 10° for small nuts as described above.

It would be possible for the die slides themselves to move in planes at angles of up to 10° to the horizontal in such a case the die faces themselves could be perpendicular to the planes of movement of the die members so that the collar would still be subjected to a slight axial deformation by the die faces. More generally considered, the die members may move in planes which are inclined to a plane perpendicular to the axis of the nut blank, such planes of movement of the die members being inclined at not more than 10° to a plane perpendicular to the axis of the nut blank.

We claim:

1. A one-piece stiff nut comprising a wrench-engageable body part, a tubular collar part extending from one end of the body part and of less cross-sectional area than the body part, a continuous, screw-threaded, through bore in said parts, a total of four indentations defining flats on the external surface of the collar, the flats being arranged two on each side of, and symmetrically with respect to, a diameter of the bore so that the angle between the lines of intersection of a plane perpendicular to the longitudinal axis of the bore and planes containing the surfaces of two adjacent flats on opposite sides of the diameter is between 110° and 130°, first arcuate portions of the collar part between each said two adjacent flats on opposite sides of said diameter being displaced inwardly towards said axis as a result of the indentations which define said two adjacent flats relative to second arcuate portions of the collar part between each two adjacent flats on the same side of the diameter with respect to said axis such that the portion of the bore in the collar part is of approximately elliptical shape to provide a prevailing torque and has no shape discontinuities in sections containing, or perpendicular to, said axis, said first and second arcuate portions curving smoothly and uninterruptedly between said flats, the locations of maximum inward displacement of the collar lying between the two adjacent flats on opposite sides of said diameter.

2. A stiff nut according to claim 1 wherein the surface of each flat is inclined at an angle of not more than 10° to a plane parallel to said axis and intersecting the surface of said flat in a line in a plane perpendicular to said axis.

3. A stiff nut according to claim 1 wherein the angle between said lines of intersection is 120°.

References Cited 1,228,099   3/1960   France.
789,395   1/1958   Great Britain.

CARL W. TOMLIN, Primary Examiner

R. S. BRITTS, Assistant Examiner

U.S. Cl. X.R.

10—86